US012189325B1

(12) United States Patent
Takahashi

(10) Patent No.: US 12,189,325 B1
(45) Date of Patent: Jan. 7, 2025

(54) INFORMATION PROCESSING DEVICE

(71) Applicant: TOSHIBA TEC KABUSHIKI KAISHA, Tokyo (JP)

(72) Inventor: Nobuaki Takahashi, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/455,750

(22) Filed: Aug. 25, 2023

(51) Int. Cl.
*G03G 21/12* (2006.01)

(52) U.S. Cl.
CPC .................................... *G03G 21/12* (2013.01)

(58) Field of Classification Search
CPC .. G03G 15/0856; G03G 21/105; G03G 21/12; G03G 21/1647; G03G 2221/1654
USPC ................................ 399/9, 34, 35, 358, 360
See application file for complete search history.

(56) References Cited

U.S. PATENT DOCUMENTS

| | | | | |
|---|---|---|---|---|
| 10,983,474 | B1 * | 4/2021 | Li | G03G 15/0856 |
| 11,815,843 | B2 * | 11/2023 | Imai | G03G 21/12 |
| 2020/0201227 | A1 * | 6/2020 | Sato | G03G 15/5079 |

FOREIGN PATENT DOCUMENTS

| | | |
|---|---|---|
| JP | 2010-127989 | 6/2010 |
| JP | 2017-151205 | 8/2017 |
| JP | 2018-205529 | 12/2018 |

* cited by examiner

*Primary Examiner* — Hoan H Tran
(74) *Attorney, Agent, or Firm* — Amin, Turocy & Watson, LLP

(57) ABSTRACT

According to one embodiment, an information processing device communicates with an image forming device including an image forming unit and a container storing waste toner from the image forming unit. The information processing device includes a communication interface and a processing circuit. The communication interface acquires data regarding an amount of the waste toner. The processing circuit detects a near-full state of the container based on comparison between an amount of the waste toner based on the data and a threshold value corresponding to the number of times of installation of the container.

20 Claims, 6 Drawing Sheets

INFORMATION PROCESSING DEVICE

FIELD

Embodiments described herein relate generally to information processing devices.

BACKGROUND

An image forming device placed in a workplace removes toner generated during printing time and toner generated during other than printing time from a photoreceptor drum and an intermediate transfer drum with a cleaning blade. For example, the toner generated during other than printing time is toner generated during alignment control for maintaining image quality or toner generated during density adjustment control for adjusting image density. The removed toner is deposited in a storage container.

The image forming device calculates the amount of the toner removed to predict near-full size of the toner deposited in the storage container. However, in an initial state of the image forming device, since the removed toner does not exist in the image forming device, the toner does not reach the storage container immediately. Therefore, there is a difference between a calculated value and an actual amount of the toner deposited in the storage container.

DETAILED DESCRIPTION

In general, according to one embodiment, an information processing device communicates with an image forming device including an image forming unit and a container containing waste toner from the image forming unit. The information processing device includes a communication interface and a processing circuit. The communication interface acquires data regarding an amount of the waste toner. The processing circuit detects near-full size of the container based on comparison between the amount of the waste toner based on the data and a threshold value corresponding to the number of times of installation of the container.

Hereinafter, several embodiments will be described with reference to the drawings. Note that, in some cases, the scale of each unit in each drawing used for the description of the embodiments below may be changed as appropriate. In some cases, in each drawing used for the description of the embodiments below, the configuration may be omitted for the description.

First Embodiment

The configuration example of an image forming device will be described.

For example, the image forming device is a multifunction peripheral (MFP).

Figure 1:
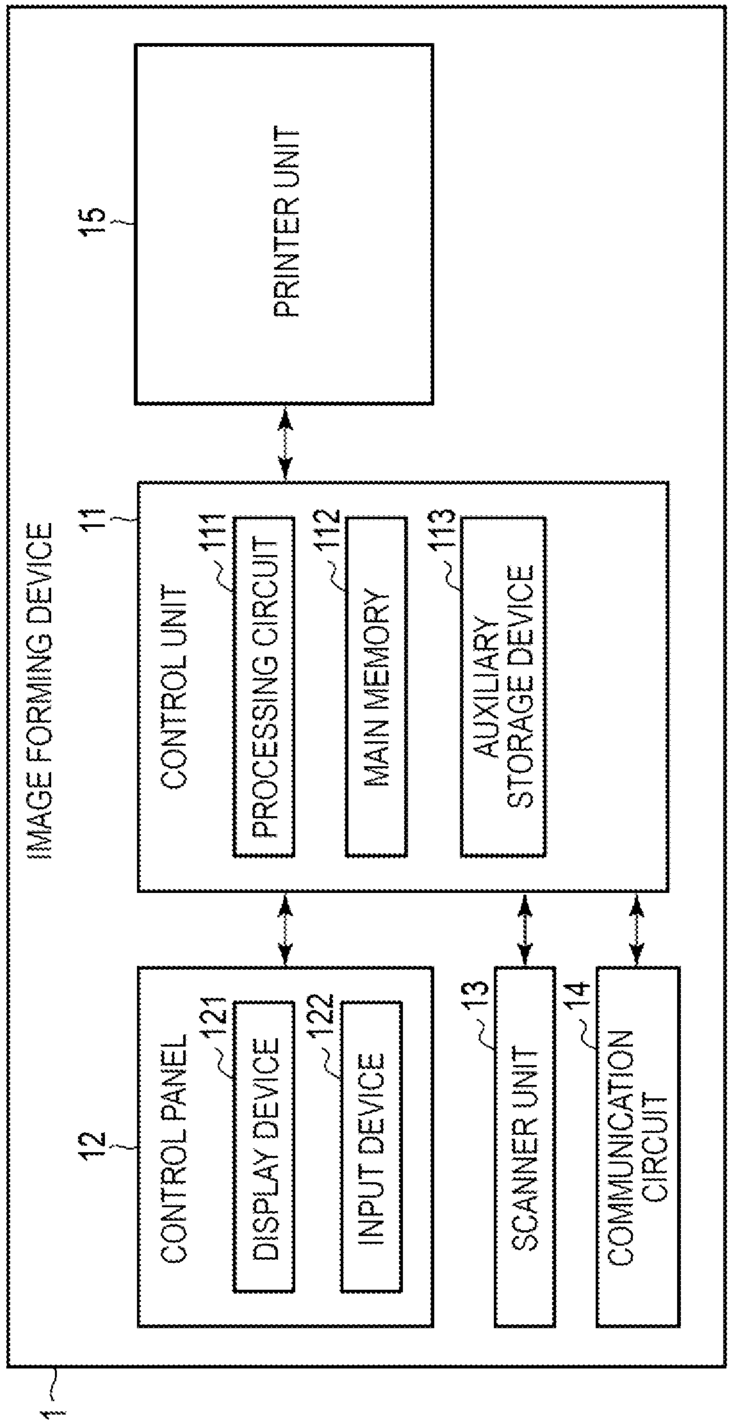
FIG. 1 is a block diagram illustrating an outline of a configuration example of an image forming device according to a first embodiment.

FIG. 1 is a block diagram illustrating an outline of a configuration example of an image forming device 1.

The image forming device 1 includes a control unit 11, a control panel 12, a scanner unit 13, a communication circuit 14, and a printer unit 15.

The control unit 11 controls operations of each unit of the image forming device 1. The control unit 11 includes a processing circuit 111, a main memory 112, and an auxiliary storage device 113.

The processing circuit 111 corresponds to a central portion of the image forming device 1. The processing circuit 111 is an element configuring a computer of the image forming device 1. The processing circuit 111 includes at least one processor such as a central processing unit (CPU). The processing circuit 111 may include an application specific integrated circuit (ASIC), a field programmable gate array (FPGA), or a graphics processing unit (GPU) in addition to or instead of the CPU. The processing circuit 111 loads a program pre-stored in the main memory 112 or the auxiliary storage device 113 into the main memory 112. The processing circuit 111 executes various processes by executing programs loaded into the main memory 112.

The main memory 112 corresponds to a main memory portion of the image forming device 1. The main memory 112 is an element configuring the computer of the image forming device 1. The main memory 112 includes a nonvolatile memory area and a volatile memory area. The main memory 112 stores an operating system or programs in the nonvolatile memory area. The main memory 112 uses the volatile memory area as a work area in which data is appropriately rewritten by the processing circuit 111. For example, the main memory 112 includes a read only memory (ROM) as the nonvolatile memory area. For example, the main memory 112 includes a random access memory (RAM) as the volatile memory area.

The auxiliary storage device 113 corresponds to an auxiliary storage portion of the image forming device 1. For example, the auxiliary storage device 113 includes a hard disk drive (HDD). The auxiliary storage device 113 may include a semiconductor storage medium such as a solid state drive (SSD) in addition to or instead of the HDD. The auxiliary storage device 113 stores the above-described programs, data used by the processing circuit 111 performing various processes, and data generated by processes of the processing circuit 111. The auxiliary storage device 113 is an example of a storage device.

The control panel 12 includes a display device 121 and an input device 122.

The display device 121 is a device capable of displaying images. The display device 121 is a liquid crystal display, an organic electroluminescence (EL) display, or the like, but not limited thereto.

The input device 122 is a device capable of inputting instructions based on user operations. The input device 122 may include a pressable button. The input device 122 may include a touch panel integrated with the display device 121.

The scanner unit 13 is a device reading images such as characters, graphics, and photographs drawn on paper placed at a predetermined position. The scanner unit 13 includes a line sensor. The line sensor may be a charge coupled device (CCD) type. The line sensor may be a contact image sensor (CIS) type. The scanner unit 13 generates image data based on an image read by using the line sensor. The scanner unit 13 transmits generated image data to the control unit 11. The control unit 11 stores the received image data in the auxiliary storage device 113 and transmits the received image data to the printer unit 15.

The communication circuit 14 is an interface for the image forming device 1 to communicate with other devices such as a personal computer (PC) or a server via a network. The network includes one or more of various networks such as the Internet, a mobile communication network, and a local area network (LAN). The LAN may be a wireless LAN or a wired LAN. The communication circuit 14 is an example of the communication interface.

The printer unit 15 is a unit printing image on paper. The printer unit 15 prints the image on the paper based on page-by-page image data transmitted from the PC via the communication circuit 14 by using a print function. The printer unit 15 prints the image on the paper based on page-by-page image data generated by the scanner unit 13 by using a copy function.

Figure 2:
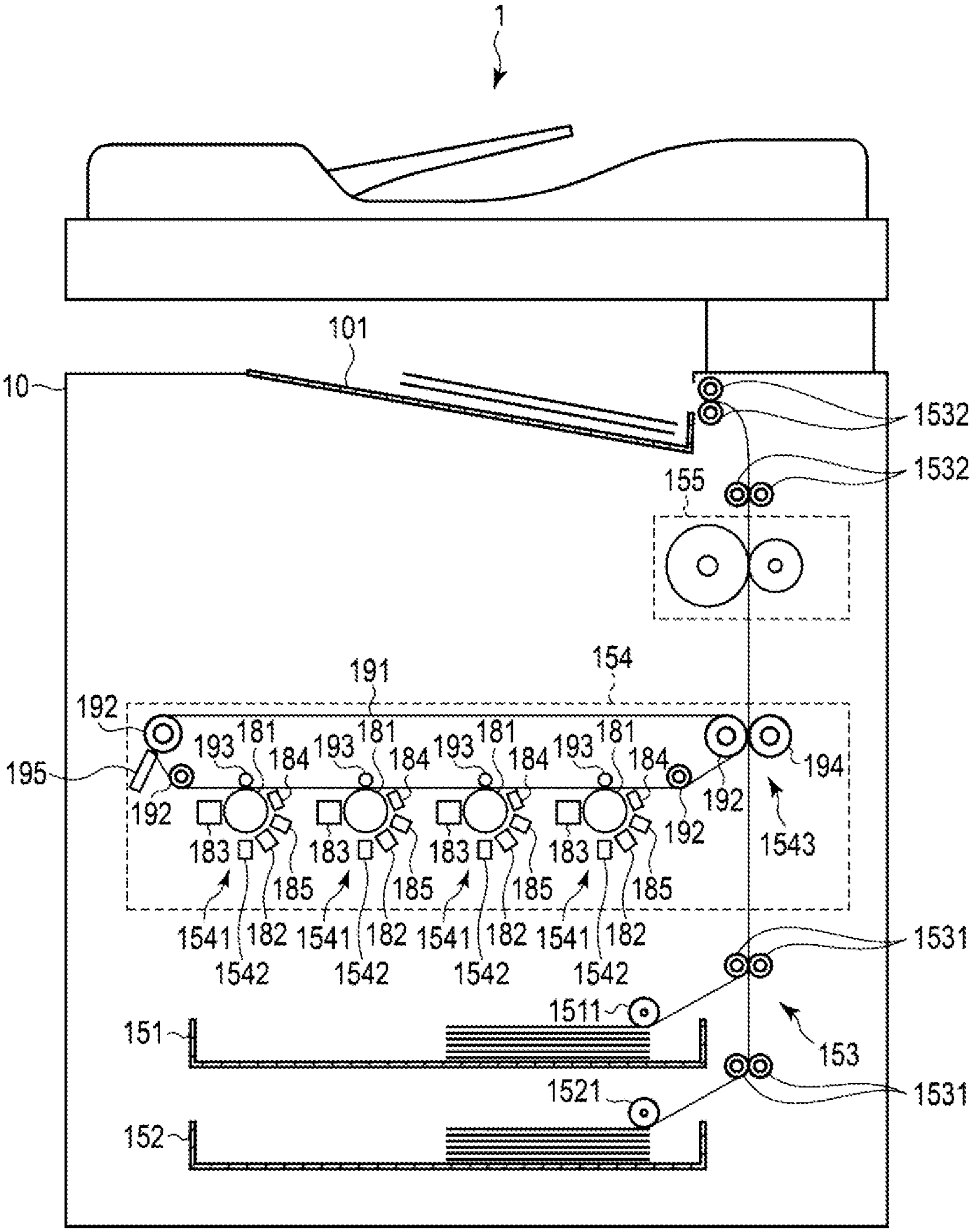
FIG. 2 is a schematic diagram of a configuration example of a printer unit.

FIG. 2 is a diagram illustrating an outline of a configuration example of the printer unit 15.

The image forming device 1 includes a housing 10 and a paper discharge tray 101. The paper discharge tray 101 is a tray that supports paper printed by the printer unit 15 and discharged from the image forming device 1.

The printer unit 15 includes a paper feed cassette 151, a paper feed cassette 152, a convey unit 153, an image forming unit 154, and a fixing device 155. Although two paper feed cassettes are illustrated in FIG. 2, the number of paper feed cassettes is not limited to two.

The paper feed cassette 151 can be drawn from the housing 10. The paper feed cassette 151 accommodates paper. The paper feed cassette 151 includes a pickup roller 1511. The pickup roller 1511 picks up the paper from the paper feed cassette 151 one sheet by one sheet. The pickup roller 1511 supplies the picked-up paper to the convey unit 153.

The paper feed cassette 152 can be drawn from the housing 10. The paper feed cassette 152 accommodates paper. The paper feed cassette 152 may accommodate paper having sizes different from the paper accommodated in the paper feed cassette 151. The paper feed cassette 152 includes a pickup roller 1521. The pickup roller 1521 picks up paper from the paper feed cassette 152 one sheet by one sheet. The pickup roller 1521 supplies the picked-up sheet to the convey unit 153.

The convey unit 153 is a mechanism conveying the paper inside the image forming device 1. The convey unit 153 includes a plurality of rollers 1531 supplying the paper picked up by the pickup roller 1511 or the pickup roller 1521 to the image forming unit 154. The convey unit 153 is provided at a downstream of the fixing device 155 and includes a plurality of rollers 1532 that discharge the paper printed by the printer unit 15 to the paper discharge tray 101.

The image forming unit 154 prints the image on the paper by forming the image on the paper. The image forming unit 154 includes a plurality of process units 1541, a plurality of exposure devices 1542, and a transfer mechanism 1543. Each of the plurality of process units 1541 corresponds to each toner of cyan, magenta, yellow, and black. The image forming unit 154 includes the exposure device 1542 for each process unit 1541. Note that the plurality of process units 1541 have the same configuration as each other. The plurality of exposure devices 1542 have the same configuration as each other. Therefore, in the following, one process unit 1541 and one exposure device 1542 will be described below.

The process unit 1541 forms the toner image on a surface of a photoreceptor drum 181. The process unit 1541 includes the photoreceptor drum 181, a charger 182, a developing device 183, a photoreceptor cleaner 184, and a static eliminator 185.

The photoreceptor drum 181 is a photoreceptor including a cylindrical drum and a photoreceptor layer formed on an outer peripheral surface of the drum. The photoreceptor drum 181 rotates at a constant speed. The charger 182 uniformly charges the photoreceptor layer on the surface of the photoreceptor drum 181. The developing device 183 is a device storing developer containing toner and magnetic carrier. The developing device 183 receives toner delivered from the toner cartridge. The carrier is stored in advance in the developing device 183. The developing device 183 causes the toner contained in each developer to adhere to the electrostatic latent image on the surface of the photoreceptor drum 181 by rotating a developing roller. Accordingly, the developing device 183 forms the toner image on the surface of the photoreceptor drum 181. The photoreceptor cleaner 184 removes the toner remaining on the surface of the photoreceptor drum 181. For example, the photoreceptor cleaner 184 includes a cleaning blade being in contact with the surface of the photoreceptor drum 181. The photoreceptor cleaner 184 removes the toner remaining on the surface of the photoreceptor drum 181 by using the cleaning blade. The static eliminator 185 removes the charge on the photoreceptor drum 181.

The exposure device 1542 irradiates the surface of the photoreceptor drum 181 with laser light through an optical system such as a polygon mirror. The exposure device 1542 forms an electrostatic pattern as the electrostatic latent image on the surface of the photoreceptor drum 181 by irradiation.

The transfer mechanism 1543 is configured to transfer the toner images formed on the surfaces of the plurality of photoreceptor drums 181 on the paper. The transfer mechanism 1543 includes an intermediate transfer belt 191, a plurality of support rollers 192, a plurality of primary transfer rollers 193, a secondary transfer roller 194, and a transfer cleaner 195.

The intermediate transfer belt 191 is an endless belt. The plurality of support rollers 192 are located inside the intermediate transfer belt 191 and draws the intermediate transfer belt 191 from the inside with a predetermined tension. Each of the plurality of primary transfer rollers 193 faces each of the plurality of photoreceptor drums 181 with the intermediate transfer belt 191 interposed therebetween. The primary transfer roller 193 allows the intermediate transfer belt 191 to be in contact with the photoreceptor drum 181. The primary transfer roller 193 forms the toner image on the intermediate transfer belt 191 by transferring the toner image formed on the surface of the photoreceptor drum 181 to the intermediate transfer belt 191. The secondary transfer roller 194 faces the support roller 192 with the intermediate transfer belt 191 interposed therebetween. The secondary transfer roller 194 forms the toner image on the paper by transferring the toner image formed on the intermediate transfer belt 191 on the paper. Forming the toner image on the paper is an example of forming the image on the paper. The transfer cleaner 195 removes the toner remaining on the surface of the intermediate transfer belt 191. For example, the transfer cleaner 195 includes a cleaning blade being in contact with the surface of the intermediate transfer belt 191. The transfer cleaner 195 removes the toner remaining on the surface of the intermediate transfer belt 191 by using the cleaning blade.

The fixing device 155 applies heat and pressure to the paper where the toner image supplied from the image forming unit 154 is formed. The fixing device 155 fixes the toner image formed on the paper to the paper by heat and pressure. For example, the fixing device 155 includes a heater.

Figure 3:
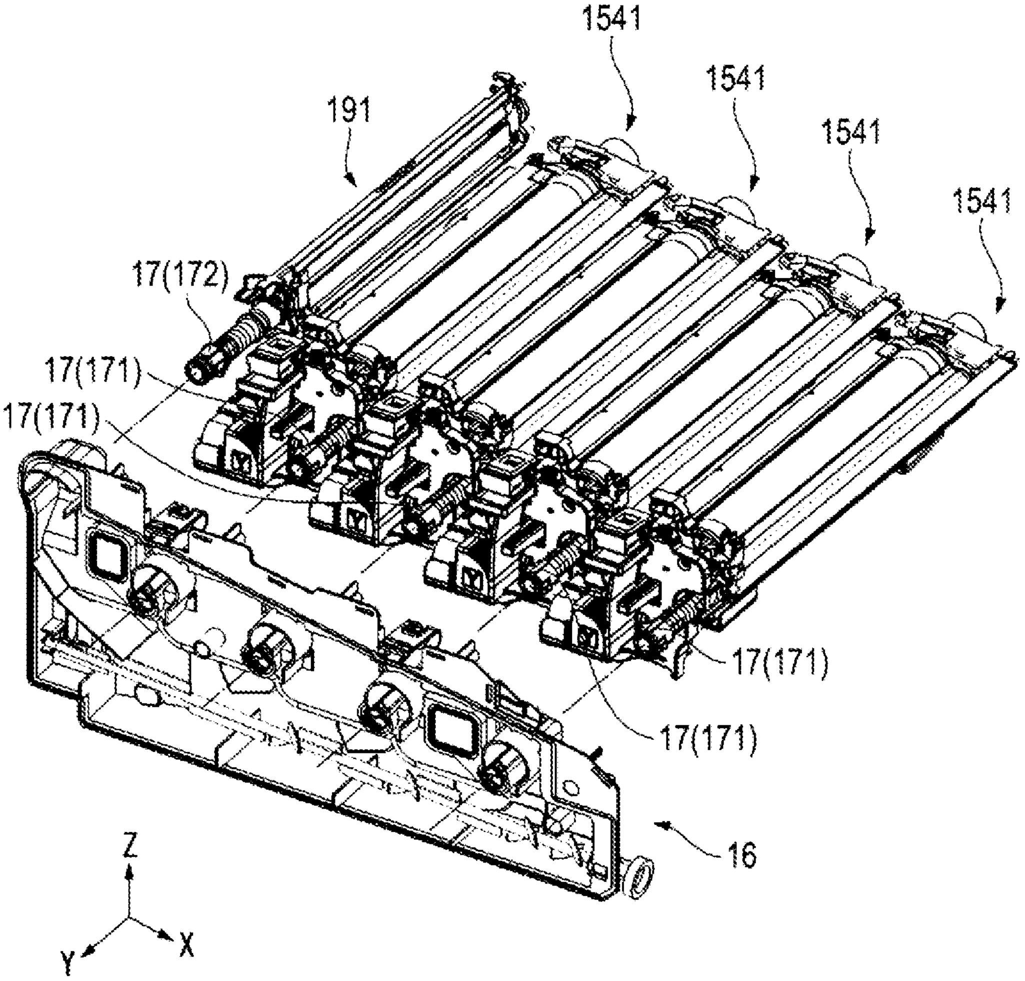
FIG. 3 is a schematic diagram of a configuration example of a storage container.

FIG. 3 is a diagram illustrating an outline of a configuration example of a storage container 16.

The image forming device 1 includes the storage container 16. The storage container 16 is a container that stores toner from the image forming unit 154. In the following, the toner from the image forming unit 154 is also referred to as waste toner. The waste toner includes toner removed from the surface of the photoreceptor drum 181 by the photoreceptor cleaner 184 and toner removed from the surface of the intermediate transfer belt 191 by the transfer cleaner 195. Note that, if the image forming device 1 includes a plurality of process units 1541, the waste toner includes toner removed from the surfaces of the plurality of photoreceptor drums 181 by the plurality of photoreceptor cleaners 184.

The image forming device 1 includes a pipe 17. The pipe 17 is an example of a guide configuring a path from the image forming unit 154 to the storage container 16. The pipe 17 includes four first pipes 171 connected to respective photoreceptor cleaners 184 of the plurality of process units 1541. The pipe 17 includes a second pipe 172 connected to the transfer cleaner 195.

The waste toner generated in the image forming unit 154 passes through the pipe 17 and moves from the image forming unit 154 to the storage container 16. After passing through the pipe 17, the waste toner is deposited in the storage container 16. For example, the waste toner generated from the photoreceptor drum 181 passes through the first pipe 171 and moves from the photoreceptor drum 181 to the storage container 16. After passing through the first pipe 171, the waste toner is deposited in the storage container 16. The waste toner generated from the intermediate transfer belt 191 passes through the second pipe 172 and moves from the intermediate transfer belt 191 to the storage container 16. After passing through the second pipe 172, the waste toner is deposited in the storage container 16. The pipe 17 differs according to a type of image forming device 1. For example, a shape of the pipe 17 differs according to the type of image forming device 1. The type is a model number of the image forming device 1 or the like.

A service person can replace the storage container 16. For example, the service person can replace the storage container 16 before the waste toner deposited in the storage container 16 becomes full. The service person can clean the pipe 17. For example, the service person can remove the waste toner filled inside the pipe 17 from the pipe 17.

Note that the hardware configuration of the image forming device 1 is not limited to the configuration described above. The image forming device 1 can omit and change the above components, and can add new components as appropriate.

Next, the data stored in the auxiliary storage device 113 of the image forming device 1 will be described.

The auxiliary storage device 113 stores a conversion value of a total amount of the waste toner. The conversion value of the total amount of the waste toner is a value indicating the total amount of the waste toner. The total amount of the waste toner is an amount of the waste toner stored in the storage container 16. The total amount of the waste toner is a sum of the amount of the waste toner generated during printing time and the amount of the waste toner generated during other than printing time. For example, the waste toner generated during other than printing time is toner generated during alignment control for maintaining image quality or toner generated during density adjustment control for adjusting image density. The waste toner generated during printing time includes the toner remaining after the transfer and removed from the surface of the photoreceptor drum 181 and the surface of the intermediate transfer belt 191. The waste toner generated during other than printing time includes the toner removed from the surface of the photoreceptor drum 181 and the surface of the intermediate transfer belt 191.

The conversion value of the total amount of the waste toner is a value calculated by the processing circuit 111. The processing circuit 111 calculates the amount of the waste toner generated during printing time. For example, the processing circuit 111 calculates the amount of the waste toner generated during printing time from a total amount of the waste toner for each printed page. The amount of the waste toner for each printed page may be determined according to the number of printed pixels. The processing circuit 111 may calculate the amount of the waste toner generated during printing time based on a number of printed pages. The processing circuit 111 calculates the amount of the waste toner generated during other than printing time. For example, the processing circuit 111 calculates the amount of the waste toner generated during other than printing time based on a sum of the amount of the waste toner corresponding to a number of times of alignment control and the amount of the waste toner corresponding to a number of times of density adjustment control. The amount of the waste toner for each alignment control can be a fixed value. The amount of the waste toner for each density adjustment control can be a fixed value. The processing circuit 111 calculates the conversion value of the total amount of the waste toner based on a sum of the amount of the waste toner generated during printing time and the amount of the waste toner generated during other than printing time. The processing circuit 111 stores the calculated conversion value of the total amount of the waste toner in the auxiliary storage device 113.

The processing circuit 111 calculates the conversion value of the total amount of the waste toner for each installation of the storage container 16 in the image forming device 1. For example, the processing circuit 111 calculates the conversion value of the total amount of the waste toner after setting a total counter during near-full size detection time described later.

The auxiliary storage device 113 stores the total counter during the near-full size detection time. The total counter during the near-full size detection time is a value indicating a number of times of installation of the storage container 16. The total counter during the near-full size detection time is an example of information indicating the number of times of installation. The number of times of installation is a number of times of installation of the storage container 16 to the image forming device 1. If the storage container 16 is installed in the initial state such as the time when the image forming device 1 is shipped, the number of times of installation is a first time. The number of times of installation is incremented by one each time the service person replaces the storage container 16. If the installation of the storage container 16 in the initial state of the image forming device 1 is regarded as replacement, the number of times of installation can also be referred to as a number of times of replacements.

In the initial state of the image forming device 1, the total counter during the near-full size detection time is set to the value indicating the first time as the number of times of installation. If the processing circuit 111 detects near-full size of the storage container 16, the storage container 16 is due for replacement. The near-full state of the storage container 16 is a state in which the storage container 16 is nearly full. Therefore, the processing circuit 111 can set the total counter during the near-full size detection time so that the number of times of installation is incremented by one each time the near-full size of the storage container 16 is detected. The processing circuit 111 may set the total counter during the near-full size detection time so that the number of times of installation is incremented by one each time the storage container 16 is replaced by the service person.

The processing circuit 111 resets the total counter during the near-full size detection time based on the cleaning of the pipe 17. The processing circuit 111 may detect the cleaning of the pipe 17 based on the operation of the input device 122 by the service person. Resetting the total counter during the near-full size detection time includes setting the total counter during the near-full size detection time as the value indicating the first time as the number of times of installation. The reason why the processing circuit 111 resets the total counter during the near-full size detection time is that the inside of the pipe 17 becomes empty due to the cleaning. Resetting the total counter during the near-full size detection time is an example of resetting the number of times of installation.

The auxiliary storage device 113 stores the conversion value of the near-full size detection amount. The conversion value of the near-full size detection amount is a reference value for detecting the near-fullness of the storage container 16. The conversion value of the near-full size detection amount is a value smaller than the full amount of the storage container 16. Although the conversion value of the near-full size detection amount is described as being 50% of the full amount of the storage container 16, conversion value of the near-full size detection amount is not limited thereto. If the full amount of the storage container 16 is 500 g, the conversion value of the near-full size detection amount is 250 g.

The auxiliary storage device 113 stores a near-full size adjustment value. The near-full size adjustment value is an adjustment value for adjusting the conversion value of the near-full size detection amount. The near-full size adjustment value is a ratio for lowering the conversion value of the near-full size detection amount. For example, the conversion value of the near-full size detection amount is a value selected from 50%, 60%, 70%, 80%, and 90%, but is not limited thereto. The user can freely set the near-full size adjustment value, and may not set the near-full size adjustment value.

The auxiliary storage device 113 stores a correction value of the number of times of use. The correction value of the number of times of use is a correction value according to the number of times of installation. The correction value of the number of times of use decreases as the number of times of installation increases. The correction value of the number of times of use decreases as the number of times of installation increases from the first time to the n-th time (n is an integer of 2 or more), and is the same if the number of times of installation is the (n+1)-th time or later. For example, for each number of times of installation, the correction value of the number of times of use is as follows. If the number of times of installation is a first time, the correction value of the number of times of use is 1.5. If the number of times of installation is a second time, the correction value of the number of times of use is 1.3. If the number of times of installation is a third time, the correction value of the number of times of use is 1.2. If the number of times of installation is a fourth time or later, the correction value of the number of times of use is 1.0.

The reason why the correction value of the number of times of use is set as described above is that the pipe 17 is empty in the initial state of the image forming device 1. Even if the image forming device 1 executes operation that leads to the generation of the waste toner in such state, the waste toner is accumulated in the pipe 17 but does not move to the storage container 16. If the waste toner starts to be accumulated in the pipe 17, the waste toner accumulated in the pipe 17 is pushed out from the pipe 17 by new waste toner each time the image forming device 1 performs the operation that leads to the generation of the waste toner. The pushed-out waste toner moves from the pipe 17 to the storage container 16. Since the pipe 17 is gradually filled with the waste toner, the entire pipe 17 may not be fully filled with the waste toner even after the second time as the number of times of installation. If the entire pipe 17 is fully filled with the waste toner, the amount of the waste toner entering the pipe 17 that leads to the generation of new waste toner and the amount of the waste toner moving from the pipe 17 to the storage container 16 are almost the same. Therefore, the correction values of the number of times of use for the first time to the third time as the number of times of installation are values larger than 1.0 and decrease as the number of times of installation increases. The correction value of the number of times of use for the fourth time or later as the number of times of installation is 1.0.

Note that the correction value of the number of times of use is not limited thereto. The number of times of installation at which the correction value of the number of times of use becomes 1.0 is not limited to the fourth time or later as the number of times of installation. The correction value of the number of times of use corresponding to the number of times of installation may differ depending on the type of the image forming device 1. The number of times of installation where the correction value of the number of times of use becomes 1.0 may differ depending on the type of the image forming device 1.

A threshold value to be compared with the conversion value of the total amount of the waste toner is a value obtained by multiplying the conversion value of the near-full size detection amount, the near-full size adjustment value, and the correction value of the number of times of use. Note that, if the near-full size adjustment value is not set, the threshold value is a value obtained by multiplying the conversion value of the near-full size detection amount and the correction value of the number of times of use. The threshold value is a value obtained based on the correction value of the number of times of use corresponding to the number of times of installation. Therefore, the threshold value is a value corresponding to the number of times of installation, similarly to the correction value of the number of times of use. Similarly to the correction value of the number of times of use, the threshold value decreases as the number of times of installation increases. Similarly to the correction value of the number of times of use, the threshold value decreases as the number of times of installation increases from the first time to the n-th time as the number of times of installation, and are the same if the number of times of installation is the (n+1)-th time or later.

Figure 4:
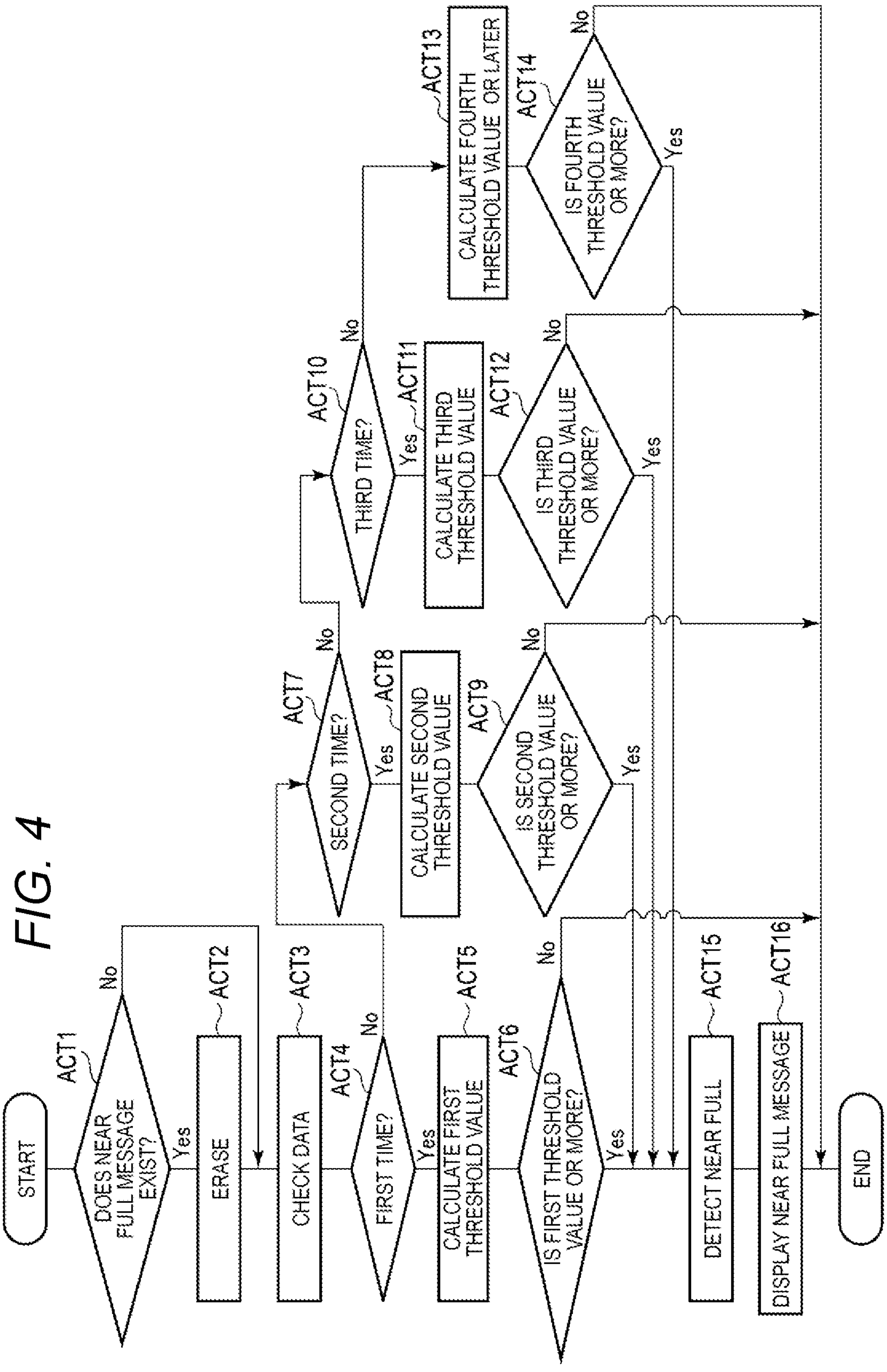
FIG. 4 is a flowchart illustrating an example of processing by the image forming device.

FIG. 4 is a flowchart illustrating an example of the processing by the image forming device 1.

Note that the processing procedure described below is merely an example, and each processing may be changed as much as possible. With respect to the processing procedure described below, steps can be omitted, replaced, and added as appropriate according to the embodiment.

The processing circuit 111 may start the processing illustrated in FIG. 4 after the waste toner is generated. The timing of starting the process may be after the printing of the job is ended. The timing of starting the process may be after the alignment control is ended or after the density adjustment control is ended.

The processing circuit 111 determines whether the near-full size message is displayed on the display device 121 (ACT1). The near-full size message is a notification indicating that the storage container 16 is near-full size. If the near-full size message is displayed on the display device 121 (ACT1, YES), the process transitions from ACT1 to ACT2. If the near-full size message is not displayed on the display device 121 (ACT1, NO), the process transitions from ACT1 to ACT3.

The processing circuit 111 erases the near-full size message displayed on the display device 121 (ACT2).

The processing circuit 111 checks the data stored in the auxiliary storage device 113 (ACT3). In ACT3, for example, the processing circuit 111 checks fluctuating data such as the conversion value of the total amount of the waste toner, the total counter during the near-full size detection time, and the near-full size adjustment value.

The processing circuit 111 calculates the threshold value according to the number of times of installation as follows. The processing circuit 111 detects the near-full size of the storage container 16 based on the comparison between the conversion value of the total amount of the waste toner and the threshold value. For example, if the conversion value of the total amount of the waste toner is the threshold value or more, the processing circuit 111 detects the near-full size of the storage container 16. On the other hand, the conversion value of the total amount of the waste toner is not the threshold value or more, the processing circuit 111 does not detect the near-fullness of the storage container 16.

The processing circuit 111 determines whether the number of times of installation is a first time (ACT4). In ACT4, for example, the processing circuit 111 determines whether the value indicating the first time as the number of times of installation is set in the total counter during the near-full size detection time. If the value indicating the first time as the number of times of installation is set in the total counter during the near-full size detection time, the processing circuit 111 may determine that the number of times of installation is a first time. If the number of times of installation is a first time (ACT4, YES), the process transitions from ACT4 to ACT5. If the number of times of installation is not a first time (ACT4, NO), the process transitions from ACT4 to ACT7.

The processing circuit 111 calculates a first threshold value (ACT5). The first threshold value is a threshold value if the number of times of installation is a first time. In ACT5, for example, the processing circuit 111 calculates the first threshold value based on the product of the conversion value of the near-full size detection amount, the near-full size adjustment value, and the correction value of the number of times of use for the first time as the number of times of installation.

The processing circuit 111 compares the conversion value of the total amount of the waste toner with the first threshold value (ACT6). If the conversion value of the total amount of the waste toner is the first threshold value or more (ACT6, YES), the processing circuit 111 detects the near-full size of the storage container 16 (ACT15). If the conversion value of the total amount of the waste toner is not the first threshold value or more (ACT6, NO), the processing circuit 111 does not detect the near-full size of the storage container 16. Therefore, the process ends.

The processing circuit 111 determines whether the number of times of installation is a second time (ACT7). In ACT7, for example, the processing circuit 111 determines whether the value indicating the second time as the number of times of installation is set in the total counter during the near-full size detection time. If the value indicating the second time as the number of times of installation is set in the total counter during the near-full size detection time, the processing circuit 111 may determine that the number of times of installation is a second time. If the number of times of installation is a second time (ACT7, YES), the process transitions from ACT7 to ACT8. If the number of times of installation is not the second time (ACT7, NO), the process transitions from ACT7 to ACT10.

The processing circuit 111 calculates a second threshold value (ACT8). The second threshold value is a threshold value if the number of times of installation is the second time. In ACT8, for example, the processing circuit 111 calculates the second threshold value based on the product of the conversion value of the near-full size detection amount, the near-full size adjustment value, and the correction value of the number of times of use for the second time as the number of times of installation. The second threshold value is smaller than the first threshold value.

The processing circuit 111 compares the conversion value of the total amount of the waste toner with the second threshold value (ACT9). If the conversion value of the total amount of the waste toner is the second threshold value or more (ACT9, YES), the processing circuit 111 detects the near-full size of the storage container 16 (ACT15). If the conversion value of the total amount of the waste toner is not the second threshold value or more (ACT9, NO), the processing circuit 111 does not detect the near-full size of the storage container 16. Therefore, the process ends.

The processing circuit 111 determines whether the number of times of installation is a third time (ACT10). In ACT10, for example, the processing circuit 111 determines whether the value indicating the third time as the number of times of installation is set in the total counter during the near-full size detection time. If the value indicating the third time as the number of times of installation is set in the total counter during the near-full size detection time, the processing circuit 111 may determine that the number of times of installation is the third time. If the number of times of installation is the third time (ACT10, YES), the process transitions from ACT10 to ACT11. If the number of times of installation is not the third time (ACT10, NO), the number of times of installation is a fourth time or later. Here, the process transitions from ACT10 to ACT13.

The processing circuit 111 calculates third threshold value (ACT11). The third threshold value is a threshold value if the number of times of installation is the third time. In ACT11, for example, the processing circuit 111 calculates the third threshold value based on the product of the conversion value of the near-full size detection amount, the near-full size adjustment value, and the correction value of the number of times of use for the third time as the number of times of installation. The third threshold value is a value smaller than the second threshold value.

The processing circuit 111 compares the conversion value of the total amount of the waste toner with the third threshold value (ACT12). If the conversion value of the total amount of the waste toner is the third threshold value or more (ACT12, YES), the processing circuit 111 detects the near-full size of the storage container 16 (ACT15). If the conversion value of the total amount of the waste toner is not the third threshold value or more (ACT12, NO), the processing circuit 111 does not detect the near-full size of the storage container 16. Therefore, the process ends.

If the number of times of installation is a fourth time or later, the processing circuit 111 calculates a fourth threshold value (ACT13). The fourth threshold value is a threshold value if the number of times of installation is the fourth time or later. The threshold value is the same if the number of times of installation is the fourth time or later regardless of the number of times of installation. In ACT13, for example, the processing circuit 111 calculates the fourth threshold value based on the product of the conversion value of the near-full size detection amount, the near-full size adjustment value, and the correction value of the number of times of use for the fourth time or later as the number of times of installation. The fourth threshold value is a value smaller than the third threshold value.

The processing circuit 111 compares the conversion value of the total amount of the waste toner with the fourth threshold value (ACT14). If the conversion value of the total amount of the waste toner is the fourth threshold value or more (ACT14, YES), the processing circuit 111 detects the near-full size of the storage container 16 (ACT15). If the conversion value of the total amount of the waste toner is not the fourth threshold value or more (ACT14, NO), the processing circuit 111 does not detect the near-full size of the storage container 16. Therefore, the process ends.

The processing circuit 111 displays the near-full size message on the display device 121 based on the detection of the near-full size of the storage container 16 (ACT15). The display device 121 displays the near-full size message based on the detection of the near-full size of the storage container 16 by the processing circuit 111. The near-full size message may include contents indicating that the replacement time of the storage container 16 is approaching. The near-full size message may include contents prompting preparation of a new storage container 16. Accordingly, the image forming device 1 can notify the near-full size of the storage container 16 at an appropriate timing.

As described above, the processing circuit 111 detects the near-full size of the storage container 16 based on the comparison between the conversion value of the total amount of the waste toner and the threshold value corresponding to the number of times of installation. Herein, the state of the waste toner inside the pipe 17 affects a deviation occurring between the threshold value corresponding to the number of times of installation and an actual amount of the waste toner deposited in the storage container 16. As the amount of the waste toner filling the inside of the pipe 17 increases, the deviation becomes smaller. The processing circuit 111 can detect the near-full size of the storage container 16 by the threshold value corresponding to the number of times of installation if the actual amount of the waste toner deposited in the storage container 16 is substantially the same regardless of the number of times of installation. Therefore, if the near-full size of the storage container 16 is detected, the image forming device 1 can reduce the deviation of the actual amount of the waste toner deposited in the storage container 16 for each number of times of installation.

The threshold value may decrease as the number of times of installation increases. The threshold value decreases as the number of times of installation increases from the first to the n-th installation, and may be the same if the number of times of installation is the (n+1)-th time or later. Herein, the pipe 17 is gradually filled with the waste toner each time the waste toner is generated. The image forming device 1 can detect the near-full size of the storage container 16 by using the threshold value reflecting the state of the waste toner inside the pipe 17.

The threshold value may be a value obtained based on the correction value of the number of times of use corresponding to the number of times of installation. Since the image forming device 1 can correct the threshold value by using the correction value of the number of times of use, the threshold value can be easily set.

The threshold value may differ depending on the type of image forming device 1. Since the pipe 17 may differ depending on the type of the image forming device 1, the image forming device 1 can set the threshold value according to the type of the image forming device 1.

The processing circuit 111 may reset the number of times of installation based on the cleaning of the pipe 17. Herein, similarly to the initial state, the inside of the pipe 17 becomes empty due to the cleaning. The image forming device 1 can set the threshold value reflecting the state of the waste toner inside the pipe 17 by resetting the number of times of installation.

Second Embodiment

A second embodiment differs from the first embodiment in that a server detects near-full size.

The second embodiment will be described below with reference to the drawings. Note that, in some cases, the scale of each unit in each drawing used for the description of the second embodiment below may be changed as appropriate. In some cases, in each drawing used for the description of the second embodiment below, the configuration may be omitted for the description.

The same units in the second embodiment as those in the first embodiment are denoted by the same reference numerals, and descriptions thereof are omitted.

Figure 5:
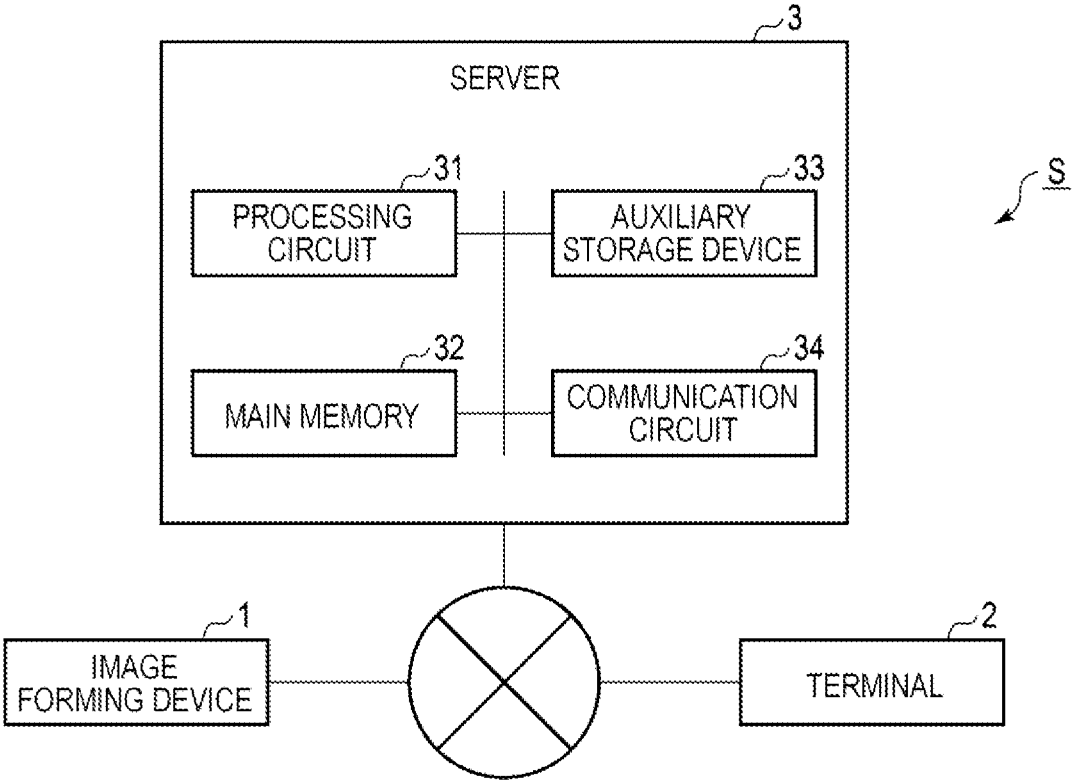
FIG. 5 is a schematic diagram of a configuration example of a system according to a second embodiment.

FIG. 5 is a diagram illustrating an outline of a configuration example of a system S.

The system S includes the image forming device 1, a terminal 2, and a server 3. The image forming device 1, the terminal 2, and the server 3 are communicably connected to each other via a network NW. The network NW includes one or more of various networks such as the Internet, mobile communication network, and LAN. The LAN may be a wireless LAN or a wired LAN. The system S may also refer to a system including at least two devices.

Since the image forming device 1 is the same as that of the first embodiment, the description thereof is omitted.

The terminal 2 is a terminal used by the service person. The terminal 2 has a communication function and a display function. The terminal 2 is a personal computer (PC), a smartphone, a tablet terminal, or the like, but is not limited thereto.

The server 3 is a device that communicates with the image forming device 1 and processes data acquired from the image forming device 1. The server 3 is an example of an information processing device.

The server 3 includes a processing circuit 31, a main memory 32, an auxiliary storage device 33, and a communication circuit 34.

The processing circuit 31 corresponds to a central portion of the server 3. The processing circuit 31 is an element configuring a computer of the server 3. The processing circuit 31 may have the same hardware configuration as the processing circuit 111. The processing circuit 31 loads a program pre-stored in the main memory 32 or the auxiliary storage device 33 into the main memory 32. The processing circuit 31 executes various processes by executing programs loaded into the main memory 32.

The main memory 32 corresponds to a main memory portion of the server 3. The main memory 32 is an element configuring the computer of the server 3. The main memory 32 may have the same hardware configuration as the main memory 112.

The auxiliary storage device 33 corresponds to an auxiliary storage portion of the server 3. The auxiliary storage device 33 may have the same hardware configuration as the auxiliary storage device 113. The auxiliary storage device 33 is an example of a storage device.

The communication circuit 34 is an interface through which the server 3 communicates with the image forming device 1 or the terminal 2 via the network NW. The communication circuit 34 is an example of a communication interface.

Note that the hardware configuration of the server 3 is not limited to the configuration described above. The server 3 can omit and change the above components, and can add new components as appropriate.

Next, the data stored in the auxiliary storage device 33 of the server 3 will be described.

The auxiliary storage device 33 stores the conversion value of the total amount of the waste toner. The conversion value of the total amount of the waste toner is a value indicating the total amount of the waste toner as described in the first embodiment. The conversion value of the total amount of the waste toner is a value based on the data regarding the amount of the waste toner. The data regarding the amount of the waste toner is data that the communication circuit 34 of the server 3 acquires from the image forming device 1 via the network NW. The image forming device 1 outputs the data regarding the amount of the waste toner for each installation of the storage container 16 to the server 3 via the network NW. For example, the image forming device 1 outputs the data regarding the amount of the waste toner to the server 3 after the server 3 sets the total counter during the near-full size detection time. The image forming device 1 may acquire information indicating the setting of the total counter during the near-full size detection time by the server 3 from the server 3.

In one example, the data regarding the amount of the waste toner is data indicating the conversion value of the total amount of the waste toner calculated by the image forming device 1. In the example, the conversion value of the total amount of the waste toner based on the waste toner amount data is a conversion value of the total amount of the waste toner indicated by the data regarding the amount of the waste toner. The processing circuit 31 stores the conversion value of the total amount of the waste toner indicated by the data regarding the amount of the waste toner acquired by the communication circuit 34 in the auxiliary storage device 33.

In another example, the data regarding the amount of the waste toner is data used for calculating the conversion value of the total amount of the waste toner. In the example, the data regarding the amount of the waste toner is data acquired by the image forming device 1. The data regarding the amount of the waste toner is data on the operation of the image forming device 1 that leads to the generation of the waste toner. The data regarding the amount of the waste toner may include the number of printed pixels per printed page. The data regarding the amount of the waste toner may include the number of printed pages. The data regarding the amount of the waste toner may include data indicating the number of times of alignment control. The data regarding the amount of the waste toner may include data indicating the number of times of density adjustment control. The processing circuit 31 calculates the amount of the waste toner generated during printing time. For example, the processing circuit 31 calculates the amount of the waste toner generated during printing time by summing the amount of the waste toner for each print page based on the number of print pixels for each print page. The processing circuit 31 may calculate the amount of the waste toner generated during printing time based on the number of printed pages. The processing circuit 31 calculates the amount of the waste toner generated during other than printing time. For example, the processing circuit 31 calculates the amount of the waste toner generated during other than printing time by summing the amount of the waste toner corresponding to the number of times of alignment control and the amount of the waste toner corresponding to the number of times of density adjustment control. The processing circuit 31 calculates the conversion value of the total amount of the waste toner based on the sum of the amount of the waste toner generated during printing time and the amount of the waste toner generated during other than printing time. The processing circuit 31 stores the calculated conversion value of the total amount of the waste toner in the auxiliary storage device 33. The processing circuit 31 calculates the conversion value of the total amount of the waste toner for each installation of the storage container 16 in the image forming device 1. For example, the processing circuit 31 calculates the conversion value of the total amount of the waste toner after setting the total counter during the near-full size detection time described later. Note that the server 3 may acquire the data regarding the amount of the waste toner from the image forming device 1 with respect to the operation of the image forming device 1 that leads to the generation of the waste toner after the data regarding the amount of the waste toner of the previous time is acquired. In the example, the image forming device 1 outputs the data regarding the amount of the waste toner to the server 3 with respect to the operation of the image forming device 1 that leads to the generation of the waste toner after the data regarding the amount of the waste toner of the previous time is output.

The auxiliary storage device 33 stores the total counter during the near-full size detection time. The total counter during the near-full size detection time is a value indicating the number of times of installation of the storage container 16, as described in the first embodiment. The processing circuit 31 can set the total counter during the near-full size detection time so that the number of times of installation is incremented by one each time the near-full size of the storage container 16 is detected. Note that the processing circuit 31 may set the total counter during the near-full size detection time so that the number of times of installation is incremented by one each time the storage container 16 is replaced by the service person. In the example, the processing circuit 31 may set the total counter during the near-full size detection time based on acquisition of information indicating replacement of the storage container 16 from the image forming device 1 by the communication circuit 34.

The processing circuit 31 resets the total counter during the near-full size detection time based on the cleaning of the pipe 17. In the example, the image forming device 1 may output information indicating the cleaning of the pipe 17 to the server 3 based on the operation of the input device 122 after cleaning of the pipe 17 by the service person. The processing circuit 31 may reset the total counter during the near-full size detection time based on the acquisition of the information indicating the cleaning of the pipe 17 from the image forming device 1 by the communication circuit 34.

The auxiliary storage device 33 stores the conversion value of the near-full size detection amount. The conversion value of the near-full size detection amount is a reference value for detecting the near-fullness of the storage container 16, as described in the first embodiment.

The auxiliary storage device 33 stores the near-full size adjustment value. The near-full size adjustment value is an adjustment value for adjusting the conversion value of the near-full size detection amount, as described in the first embodiment. The processing circuit 31 stores the near-full size adjustment value in the auxiliary storage device 33 based on the acquisition of the near-full size adjustment value from the image forming device 1 by the communication circuit 34. The image forming device 1 may output the near-full size adjustment value to the server 3 each time the server 3 outputs the data regarding the amount of the waste toner. The image forming device 1 may output the near-full size adjustment value to the server 3 based on the change of the near-full size adjustment value via the input device 122 by the user.

The auxiliary storage device 33 stores the correction value of the number of times of use. The correction value of the number of times of use is a correction value according to the number of times of installation, as described in the first embodiment. The correction value of the number of times of use decreases as the number of times of installation increases. The correction value of the number of times of use decreases as the number of times of installation increases from the first time to the n-th time of number of times of installation, and is the same if the number of times of installation is the (n+1)-th time or later. The correction value of the number of times of use corresponding to the number of times of installation may differ depending on the type of the image forming device 1. The correction value of the number of times of use may be stored in advance in the auxiliary storage device 33 for each image forming device. The processing circuit 31 may store the correction value of the number of times of use in the auxiliary storage device 33 based on the acquisition of correction value of the number of times of use from the image forming device 1 by the communication circuit 34. In the example, the image forming device 1 may output the correction value of the number of times of use to the server 3 each time the server 3 outputs the data regarding the amount of the waste toner.

The threshold value to be compared with the conversion value of the total amount of the waste toner is a value obtained by multiplying the conversion value of the near-full size detection amount, the near-full size adjustment value, and the correction value of the number of times of use, as described in the first embodiment. Note that, if the near-full size adjustment value is not set, the threshold value is a value obtained by multiplying the conversion value of the near-full size detection amount and the correction value of the number of times of use. The threshold value is a value obtained based on the correction value of the number of times of use corresponding to the number of times of installation. Therefore, similarly to the correction value of the number of times of use, the threshold value is a value corresponding to the number of times of installation. Similarly to the correction value of the number of times of use, the threshold value decreases as the number of times of installation increases. Similarly to the correction value of the number of times of use, the threshold value decreases as the number of times of installation increases from the first to the n-th installation, and is the same if the number of times of installation is the (n+1)-th time or later.

Figure 6:
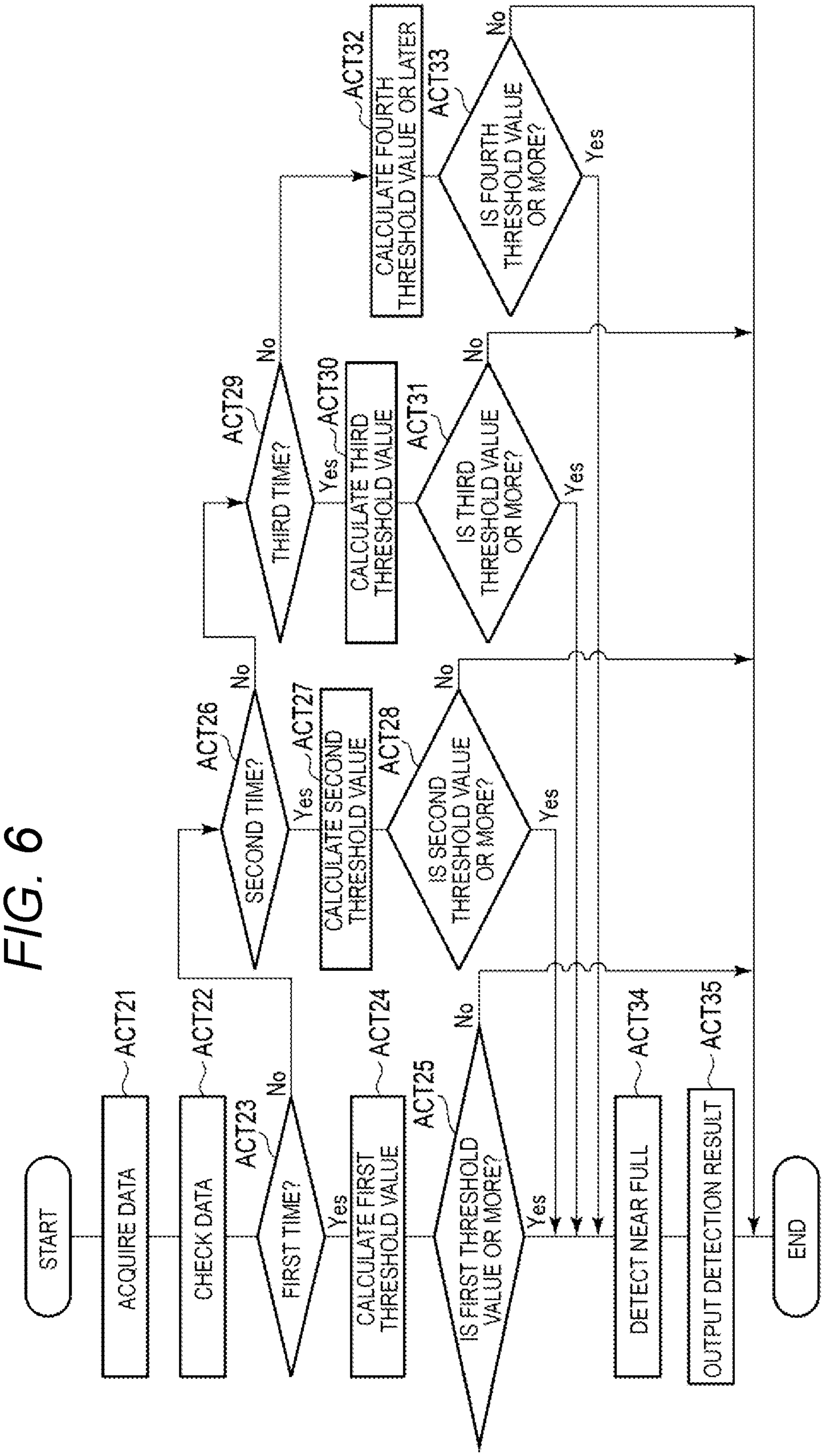
FIG. 6 is a flowchart illustrating an example of processing by an information processing device.

FIG. 6 is a flowchart illustrating an example of the processing by the server 3.

Note that the processing procedure described below is merely an example, and each processing may be changed as much as possible. With respect to the processing procedure described below, steps can be omitted, replaced, and added as appropriate according to the embodiment.

The processing circuit 31 may start the processing illustrated in FIG. 6 each time the server 3 acquires the data regarding the amount of the waste toner from the image forming device 1. The image forming device 1 may output the data regarding the amount of the waste toner to the server 3 at a predetermined timing such as once a day.

The processing circuit 31 acquires the data from the image forming device 1 by using the communication circuit 34 (ACT21). The communication circuit 34 acquires the data from the image forming device 1 via the network NW. For example, the communication circuit 34 acquires the data regarding the amount of the waste toner from the image forming device 1 via the network NW. A case will be described where the data regarding the amount of the waste toner is data indicating the conversion value of the total amount of the waste toner calculated by the image forming device 1. Here, the processing circuit 31 stores, in the auxiliary storage device 33, the conversion value of the total amount of the waste toner indicated by the data regarding the amount of the waste toner acquired by the communication circuit 34. A case will be described where the data regarding the amount of the waste toner is data used for calculating the conversion value of the total amount of the waste toner. Here, the processing circuit 31 calculates the conversion value of the total amount of the waste toner based on the data regarding the amount of the waste toner acquired by the communication circuit 34. The processing circuit 31 stores the calculated conversion value of the total amount of the waste toner in the auxiliary storage device 33. The communication circuit 34 may acquire the near-full size adjustment value from the image forming device 1 via the network NW. The processing circuit 31 stores the near-full size adjustment values in the auxiliary storage device 33. The communication circuit 34 may acquire the correction value of the number of times of use from the image forming device 1 via the network NW. The processing circuit 31 stores the correction value of the number of times of use in the auxiliary storage device 33.

The processing circuit 31 checks the data stored in auxiliary storage device 33 (ACT22). In ACT22, for example, the processing circuit 31 checks fluctuating data such as the conversion value of the total amount of the waste toner, the total counter during the near-full size detection time, and the near-full size adjustment value.

The processing circuit 31 calculates the threshold value according to the number of times of installation as follows. The processing circuit 31 detects the near-full size of the storage container 16 based on the comparison between the conversion value of the total amount of the waste toner and the threshold value. For example, if the conversion value of the total amount of the waste toner is the threshold value or more, the processing circuit 31 detects the near-full size of the storage container 16. On the other hand, the conversion value of the total amount of the waste toner is not the threshold value or more, the processing circuit 31 does not detect the near-fullness of the storage container 16.

The processing circuit 31 determines whether the number of times of installation is a first time (ACT23). In ACT23, for example, the processing circuit 31 determines whether the value indicating the first time as the number of times of installation is set in the total counter during the near-full size detection time. If the value indicating the first time as the number of times of installation is set in the total counter during the near-full size detection time, the processing circuit 31 may determine that the number of times of installation is the first time. If the number of times of installation is the first time (ACT23, YES), the process transitions from ACT23 to ACT24. If the number of times of installation is not the first time (ACT23, NO), the process transitions from ACT23 to ACT26.

The processing circuit 31 calculates the first threshold value (ACT24). The first threshold value is a threshold value if the number of times of installation is a first time. In ACT24, for example, the processing circuit 31 calculates the first threshold value based on the product of the conversion value of the near-full size detection amount, the near-full size adjustment value, and the correction value of the number of times of use for the first time as the number of times of installation.

The processing circuit 31 compares the conversion value of the total amount of the waste toner with the first threshold value (ACT25). If the conversion value of the total amount of the waste toner is the first threshold value or more (ACT25, YES), the processing circuit 31 detects the near-full size of the storage container 16 (ACT34). If the conversion value of the total amount of the waste toner is not the first threshold value or more (ACT25, NO), the processing circuit 31 does not detect the near-full size of the storage container 16. Therefore, the process ends.

The processing circuit 31 determines whether the number of times of installation is a second time (ACT26). In ACT26, for example, the processing circuit 31 determines whether the value indicating the second time as the number of times of installation is set in the total counter during the near-full size detection time. If the value indicating the second time as the number of times of installation is set in the total counter during the near-full size detection time, the processing circuit 31 may determine that the number of times of installation is the second time. If the number of times of installation is the second time (ACT26, YES), the process transitions from ACT26 to ACT27. If the number of times of installation is not the second time (ACT26, NO), the process transitions from ACT26 to ACT29.

The processing circuit 31 calculates the second threshold value (ACT27). The second threshold value is a threshold value if the number of times of installation is the second time. In ACT27, for example, the processing circuit 31 calculates the second threshold value based on the product of the conversion value of the near-full size detection amount, the near-full size adjustment value, and the correction value of the number of times of use for the second time as the number of times of installation. The second threshold value is a value smaller than the first threshold value.

The processing circuit 31 compares the conversion value of the total amount of the waste toner with the second threshold value (ACT28). If the conversion value of the total amount of the waste toner is the second threshold value or more (ACT28, YES), the processing circuit 31 detects the near-full size of the storage container 16 (ACT34). If the conversion value of the total amount of the waste toner is not the second threshold value or more (ACT28, NO), the processing circuit 31 does not detect the near-full size of the storage container 16. Therefore, the process ends.

The processing circuit 31 determines whether the number of times of installation is a third time (ACT29). In ACT29, for example, the processing circuit 31 determines whether the value indicating the third time as the number of times of installation is set in the total counter during the near-full size detection time. If the value indicating the third time as the number of times of installation is set in the total counter during the near-full size detection time, the processing circuit 31 may determine that the number of times of installation is the third time. If the number of times of installation is the third time (ACT29, YES), the process transitions from ACT29 to ACT30. If the number of times of installation is not a third time (ACT29, NO), the number of times of installation is a fourth time or later. Here, the process transitions from ACT29 to ACT32.

The processing circuit 31 calculates the third threshold value (ACT30). The third threshold value is a threshold value if the number of times of installation is the third time. In ACT30, for example, the processing circuit 31 calculates the third threshold value based on the product of the conversion value of the near-full size detection amount, the near-full size adjustment value, and the correction value of the number of times of use for the third time as the number of times of installation. The third threshold value is a value smaller than the second threshold value.

The processing circuit 31 compares the conversion value of the total amount of the waste toner with the third threshold value (ACT31). If the conversion value of the total amount of the waste toner is the third threshold value or more (ACT31, YES), the processing circuit 31 detects the near-full size of the storage container 16 (ACT34). The conversion value of the total amount of the waste toner is not the third threshold value or more (ACT31, NO), the processing circuit 31 does not detect the near-full size of the storage container 16. Therefore, the process ends.

If the number of times of installation is a fourth time or later, the processing circuit 31 calculates the fourth threshold value (ACT32). The fourth threshold value is a threshold value if the number of times of installation is the fourth time or later. The threshold value is the same if the number of times of installation is the fourth time or later regardless of the number of times of installation. In ACT32, for example, the processing circuit 31 calculates the fourth threshold value based on the product of the conversion value of the near-full size detection amount, the near-full size adjustment value, and the correction value of the number of times of use for the fourth time or later as the number of times of installation. The fourth threshold value is a value smaller than the third threshold value.

The processing circuit 31 compares the conversion value of the total amount of the waste toner with the fourth threshold value (ACT33). If the conversion value of the total amount of the waste toner is the fourth threshold value or more (ACT33, YES), the processing circuit 31 detects the near-full size of the storage container 16 (ACT34). The conversion value of the total amount of the waste toner is not the fourth threshold value or more (ACT33, NO), the processing circuit 31 does not detect the near-full size of the storage container 16. Therefore, the process ends.

The processing circuit 31 outputs the near-full size message to the terminal 2 based on the detection of the near-full size of the storage container 16 by using the communication circuit 34 (ACT35). The communication circuit 34 outputs the near-full size message to the terminal 2 via the network NW based on the detection of the near-full size of the storage container 16 by the processing circuit 31. The terminal 2 displays the near-full size message. The near-full size message is a notification indicating that the storage container 16 is near-full size, as described in the first embodiment. Accordingly, the server 3 can notify the near-full size of the storage container 16 at an appropriate timing.

Note that the processing circuit 31 may start the processing illustrated in FIG. 6 based on the request for the detection result from the terminal 2. The request for the detection result is a request for the detection result based on the detection processing of the near-full size of the storage container 16 by the server 3. In the example, in ACT21, the processing circuit 31 acquires the data regarding the amount of the waste toner from the image forming device 1 based on the request for the detection result from the terminal 2 by using the communication circuit 34. The communication circuit 34 acquires the data regarding the amount of the waste toner from the image forming device 1 based on the request for the detection result from the terminal 2 via the network NW. For example, the communication circuit 34 outputs the request for the data regarding the amount of the waste toner to the image forming device 1 based on the request for the detection result from the terminal 2 via the network NW. The communication circuit 34 acquires the data regarding the amount of the waste toner from the image forming device 1 via the network NW as response to the output of the request for the data regarding the amount of the waste toner. In the example, the communication circuit 34 outputs the detection result of the near-full size of the storage container 16 to the terminal 2 based on the comparison between the conversion value of the total amount of the waste toner and the threshold value via the network NW. For example, if the conversion value of the total amount of the waste toner is the threshold value or more, the processing circuit 31 detects the near-full size of the storage container 16. The communication circuit 34 outputs the detection result indicating the near-full size of the storage container 16 to the terminal 2 via the network NW. If the conversion value of the total amount of the waste toner is not the threshold value or more, the processing circuit 31 does not detect the near-full size of the storage container 16. The communication circuit 34 outputs the detection result indicating that the storage container 16 is not near full to the terminal 2 via the network NW. Accordingly, the server 3 can notify the latest detection result of the terminal 2 at the timing that the service person wants to confirm.

As described above, the processing circuit 31 detects the near-full size of the storage container 16 based on the comparison between the conversion value of the total amount of the waste toner and the threshold value corresponding to the number of times of installation. Herein, the state of the waste toner inside the pipe 17 affects the deviation between the threshold value corresponding to the number of times of installation and the actual amount of the waste toner deposited in the storage container 16. As the amount of the waste toner filling the inside of the pipe 17 increases, the deviation becomes smaller. The processing circuit 31 can detect the near-full size of the storage container 16 by the threshold value according to the number of times of installation, if the actual amount of the waste toner deposited in the storage container 16 is substantially the same regardless of the number of times of installation. Therefore, during the detection of the near-full size of the storage container 16, the server 3 can reduce the deviation of the actual amount of the waste toner deposited in the storage container 16 for each number of times of installation.

The threshold value may decrease, as the number of times of installation increases. The threshold value may decrease as the number of times of installation increases from the first time to the n-th time, and may be the same if the (n+1)-th time or later is the number of times of installation. Herein, the pipe 17 is gradually filled with the waste toner each time the waste toner is generated. The server 3 can detect the near-full size of the storage container 16 by using the threshold value reflecting the state of the waste toner inside the pipe 17.

The threshold value may be the value obtained based on the correction value of the number of times of use corresponding to the number of times of installation. Since the server 3 can correct the threshold value by using the correction value of the number of times of use, the threshold value can be easily set.

The threshold value may differ depending on the type of image forming device 1. Since the pipe 17 may differ depending on the type of the image forming device 1, the server 3 can set the threshold value according to the type of the image forming device 1.

The processing circuit 31 may reset the number of times of installation based on the cleaning of the pipe 17. Herein, similarly to the initial state, the inside of the pipe 17 becomes empty due to the cleaning. The server 3 can set the threshold value reflecting the state of the waste toner inside the pipe 17 by resetting the number of times of installation.

Other Embodiments

The above-described embodiments may be applied not only to devices, but also to methods performed by the devices. The above-described embodiments may be applied to a program capable of causing the computer of the device to perform each function. The above-described embodiments may be applied to recording media storing the program.

The program may be transferred while stored in the device according to the embodiment, or may be transferred without being stored in the device. In the latter case, the program may be transferred via a network, or may be transferred while being recorded on a recording medium. The recording medium is a non-transitory tangible medium. The recording medium is a computer-readable medium. The recording medium may be a medium capable of storing a program of a CD-ROM, a memory card, or the like and may be readable by the computer, and the form is not limited.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

APPENDIX

The first embodiment described above may be expressed as follows.

(1) An image forming device including:

an image forming unit;

a container storing waste toner from the image forming unit; and a processing circuit calculating an amount of the waste toner and detecting a near-full state of the container based on comparison between the amount of the waste toner and a threshold value corresponding to a number of times of installation of the container.

(2) The image forming device according to (1), in which the threshold value decreases as the number of times of installation increases.

(3) The image forming device according to (1) or (2), in which the threshold value decreases as the number of times of installation increases from a first time to an n-th time (n is an integer of 2 or more), and is the same if a (n+1)-th time or later is the number of times of installation.

(4) The image forming device according to any one of (1) to (3), in which the threshold value is a value obtained based on a correction value corresponding to the number of times of installation.

(5) The image forming device according to any one of (1) to (4), further including a display device displaying notification based on detection of the near-full state of the container by the processing circuit.

(6) The image forming device according to any one of (1) to (5), further including a guide configuring a path from the image forming unit to the container.

(7) The image forming device according to (6), in which the processing circuit resets the number of times of installation based on cleaning of the guide.

(8) The image forming device according to (6) or (7), in which the guide differs depending on a type of the image forming device, and the threshold value differs depending on the type of the image forming device.

The second embodiment described above may be expressed as follows.

(1) An information processing device communicating with an image forming device including an image forming unit and a container storing waste toner from the image forming unit, the information processing device including:

a communication interface acquiring data regarding an amount of the waste toner; and a processing circuit detecting a near-full state of the container based on comparison between an amount of the waste toner and a threshold value corresponding to the number of times of installation of the container based on the data.

(2) The information processing device according to (1), in which the data includes data indicating the amount of the waste toner calculated by the image forming device.

(3) The information processing device according to (1) or (2), in which the threshold value decreases as the number of times of installation increases.

(4) The information processing device according to any one of (1) to (3), in which the threshold value decreases as the number of times of installation increases from a first time to an n-th time (n is an integer of 2 or more), and is the same if a (n+1)-th time or later is the number of times of installation.

(5) The information processing device according to any one of (1) to (4), in which the threshold value is a value obtained based on a correction value corresponding to the number of times of installation.

(6) The information processing device according to any one of (1) to (5), in which the communication interface outputs notification to a terminal based on detection of the near-full state of the container by the processing circuit.

(7) The information processing device according to any one of (1) to (5), in which the communication interface acquires the data regarding the amount of the waste toner based on a request from the terminal, and outputs a detection result of the near-full state of the container based on the comparison between the amount of the waste toner and the threshold value to the terminal.

(8) The information processing device according to any one of (1) to (7), in which the image forming device includes a guide configuring a path from the image forming unit to the container.

(9) The information processing device according to (8), in which the processing circuit resets the number of times of installation based on cleaning of the guide.

(10) The information processing device according to (8) or (9), in which the guide differs depending on a type of the image forming device, and the threshold value differs depending on the type of the image forming device.

What is claimed is:

1. An information processing device that communicates with an image forming device including an image forming component and a container storing waste toner from the image forming component, the information processing device comprising:

a communication interface that acquires data regarding an amount of the waste toner; and a processing circuit that detects a near-full state of the container based on a comparison between an amount of the waste toner in the container and a threshold value corresponding to a number of times of installation of the container based on the data.

2. The information processing device according to claim 1, wherein the data includes data indicating an amount of the waste toner calculated by the image forming device.

3. The information processing device according to claim 1, wherein the threshold value decreases as the number of times of installation increases.

4. The information processing device according to claim 1, wherein the threshold value decreases as the number of times of installation increases from a first time to an n-th time (n is an integer of 2 or more), and is the same if a (n+1)-th time or later is the number of times of installation.

5. The information processing device according to claim 1, wherein the threshold value is a value obtained based on a correction value according to the number of times of installation.

6. The information processing device according to claim 1, wherein the communication interface outputs notification to a terminal based on detection of the near-full state of the container by the processing circuit.

7. The information processing device according to claim 1, wherein the communication interface acquires the data regarding the amount of the waste toner based on a request from a terminal, and outputs a detection result of the near-full state of the container based on the comparison between the amount of the waste toner and the threshold value to the terminal.

8. The information processing device according to claim 1, wherein the image forming device includes a guide that configures a path from the image forming component to the container.

9. The information processing device according to claim 8, wherein the processing circuit resets the number of times of installation based on cleaning of the guide.

10. The information processing device according to claim 8, wherein the guide differs depending on a type of the image forming device, and the threshold value differs depending on the type of the image forming device.

11. A method for an information processing device comprising:

acquiring data regarding an amount of waste toner in a container storing waste toner from an image forming component; and detecting a near-full state of the container based on a comparison between the amount of the waste toner in the container and a threshold value corresponding to a number of times of installation of the container based on the data; and communicating a detection result with an image forming device.

12. The method according to claim 11, wherein the data includes data indicating an amount of the waste toner calculated by the image forming device.

13. The method according to claim 11, wherein the threshold value decreases as the number of times of installation increases.

14. The method according to claim 11, wherein the threshold value decreases as the number of times of installation increases from a first time to an n-th time (n is an integer of 2 or more), and is the same if a (n+1)-th time or later is the number of times of installation.

15. The method according to claim 11, wherein the threshold value is a value obtained based on a correction value according to the number of times of installation.

16. The method according to claim 11, wherein the communication interface outputs notification to a terminal based on detection of the near-full state of the container by the processing circuit.

17. The method according to claim 11, wherein the communication interface acquires the data regarding the amount of the waste toner based on a request from a terminal, and outputs a detection result of the near-full state of the container based on the comparison between the amount of the waste toner and the threshold value to the terminal.

18. The method according to claim 11, wherein the image forming device includes a guide that configures a path from an image forming component to the container, the method further comprising:

resetting the number of times of installation based on cleaning of the guide.

19. A multifunction peripheral, comprising:

a toner supply container;

an information processing device that communicates with an image forming device;

an image forming component;

a container storing waste toner from the image forming component;

a communication interface that acquires data regarding an amount of the waste toner; and a processing circuit that detects a near-full state of the container based on a comparison between an amount of the waste toner in the container and a threshold value corresponding to a number of times of installation of the container based on the data.

20. The multifunction peripheral according to claim 19, wherein the data includes data indicating an amount of the waste toner calculated by the image forming device, the guide differs depending on a type of the image forming device, and the threshold value differs depending on the type of the image forming device.

* * * * *